United States Patent [19]

Toy

[11] 4,386,402
[45] May 31, 1983

[54] COMPUTER WITH DUAL VAT BUFFERS FOR ACCESSING A COMMON MEMORY SHARED BY A CACHE AND A PROCESSOR INTERRUPT STACK

[75] Inventor: Wing N. Toy, Glen Ellyn, Ill.

[73] Assignee: Bell Telephone Laboratories, Incorporated, Murray Hill, N.J.

[21] Appl. No.: 190,611

[22] Filed: Sep. 25, 1980

[51] Int. Cl.³ .......................... G06F 9/32; G06F 9/46; G06F 13/00
[52] U.S. Cl. ..................................... 364/200; 365/230
[58] Field of Search ... 364/200 MS File, 900 MS File; 365/230, 231

[56] References Cited

U.S. PATENT DOCUMENTS

| | | | |
|---|---|---|---|
| 3,761,881 | 9/1973 | Anderson et al. | 364/200 |
| 3,979,726 | 9/1976 | Lange et al. | 364/200 |
| 4,068,303 | 1/1978 | Morita | 364/200 |
| 4,149,245 | 4/1979 | Gannon et al. | 364/200 |
| 4,164,017 | 8/1979 | Randell et al. | 364/200 |
| 4,167,779 | 9/1979 | Sullivan et al. | 364/200 |
| 4,197,580 | 4/1980 | Chang et al. | 364/200 |
| 4,264,953 | 4/1981 | Douglas et al. | 364/200 |
| 4,298,929 | 11/1981 | Capozzi | 364/200 |
| 4,322,795 | 3/1982 | Lange et al. | 364/200 |
| 4,354,232 | 10/1982 | Ryan | 364/200 |

*Primary Examiner*—Raulfe B. Zache
*Assistant Examiner*—Archie E. Williams, Jr.
*Attorney, Agent, or Firm*—P. Visserman

[57] ABSTRACT

The processor's interrupt stack memory and cache memory share a common data memory and are accessed using virtual addresses. A separate address translation buffer (ATB) is used for both the interrupt stack memory and cache memory to perform the virtual address to real address translations which are required to access the common data memory. The cache ATB and a cache controller provide the addressing to access cache data words in the common memory; whereas the interrupt stack ATB alone provides the addressing necessary to access the interrupt stack data words in the common memory.

11 Claims, 3 Drawing Figures

COMPUTER WITH DUAL VAT BUFFERS FOR ACCESSING A COMMON MEMORY SHARED BY A CACHE AND A PROCESSOR INTERRUPT STACK

TECHNICAL FIELD

My invention relates to data processing systems and particularly to a processor having an interrupt stack memory which is physically associated with a cache memory and which has its own address translation buffer for converting virtual addresses into real addresses.

BACKGROUND OF THE INVENTION

Computer systems generally comprise a processor which executes program routines from memory and operates on data stored in memory. The execution of a program routine may be interrupted, for example, by means of an external interrupt signal, to cause the processor to begin execution of a so-called interrupt routine. Before the processor begins the execution of the interrupt routine, however, it stores certain information, which represents the operational state of the processor and which is referred to as the processor context, in an area of memory called the interrupt stack. Upon completion of the interrupt routine, the processor retrieves the context information from memory to restore the processor to the operational state existing before the interrupt and resumes processing of the interrupted routine.

Modern computer systems employ processors which are capable of operating at much higher rates of execution than large capacity main memories can support, and a low capacity, high-speed cache memory is commonly used in addition to a large capacity main memory to improve program execution speed. The cache memory stores a limited number of instructions or data words; and for each memory read operation, a control circuit associated with the cache memory will check the cache memory to determine if the information is available in the cache memory, otherwise the processor will read the main memory. Memory write operations generally cause information to be written simultaneously in the cache and the main memory. Main memory access times generally are substantially greater than cache memory access time, and it is well recognized that in normal operations the addition of a cache memory saves a substantial amount of processor time.

The context information usually consists of several data words and the storing and retrieving of context information tends to create a significant demand on processor time, particularly, in the event of high interrupt activity. To alleviate this burden, some prior art processing systems store the context information in the cache memory. While this may decrease the amount of time required to read context information after the interrupt has been serviced, it does not decrease the time required to store the information since it must be written into the main memory as well as the cache memory. Furthermore, since the context information can be replaced by other data, it may not be available in the cache memory when it is needed. In that case, the context information must be read from the main memory and no advantage has been gained from storing the information in the cache memory.

For many applications, including the addressing of the interrupt stack, it is desirable to use the virtual addressing technique. By this technique, a program specifies a virtual address which is a reference to a defined real memory location but which by itself does not define the real memory location. When virtual addressing is used, a virtual address to real address translation must be made, and unless translation circuitry, such as an address translation buffer, is used, virtual addressing of the interrupt stack will further increase the real-time burden on the processor associated with interrupt activity.

SUMMARY OF THE INVENTION

Advantageously, in a data processing system, in accordance with the present invention, interrupt service time is improved by providing a buffer memory which has a cache memory section and an interrupt stack memory section. A processor generates virtual addresses and a read signal to access the buffer memory and a main memory. In response to certain of the virtual addresses, an address translation circuit generates a first set of real addresses which access the cache memory section of the buffer memory and the main memory; and in response to other of the virtual addresses, the address translation circuit generates a second set of real addresses and a select signal which access the interrupt stack memory section of the buffer memory.

Advantageously, the address translation circuit may be comprised of a first address translation buffer (ATB) for translating certain of the virtual addresses to the first set of real addresses and a second ATB for translating other of the virtual addresses to the second set of real addresses.

Further, the second ATB may be comprised of a register and a comparator circuit. The comparator circuit compares the virtual addresses with the contents of the register and generates the select signal when the contents of the register match a virtual address.

Additionally, the processor may store information in the register of the second ATB by transmitting data and a control signal to the second ATB. The register responds to the control signal to store the data internally.

Advantageously, the cache memory section of the buffer memory may be comprised of a tag memory, a cache control circuit, a comparator circuit, and a data memory. The virtual address transmitted by the processor may be comprised of segment address bits, page address bits, and word address bits. The ATB circuit translates the segment and page address bits into significant address bits and transmits the significant address bits and word address bits to the buffer memory as the real address. The tag and data memory, in response to the read signal and the word address bits, each read a data word location. The comparator circuit compares the tag memory's data word with the significant address bits; and if a match occurs, the comparator transmits a cache signal to the cache control circuit. In response to the cache signal, the cache control circuit enables the data memory to transmit the data memory's data word to the processor.

Also in accordance with this invention, the select signal generated by the second ATB will inhibit the operation of the first ATB.

BRIEF DESCRIPTION OF THE DRAWING

The invention will be better understood from the following detailed description when read with reference to the drawing in which.

DETAILED DESCRIPTION

Figure 1:
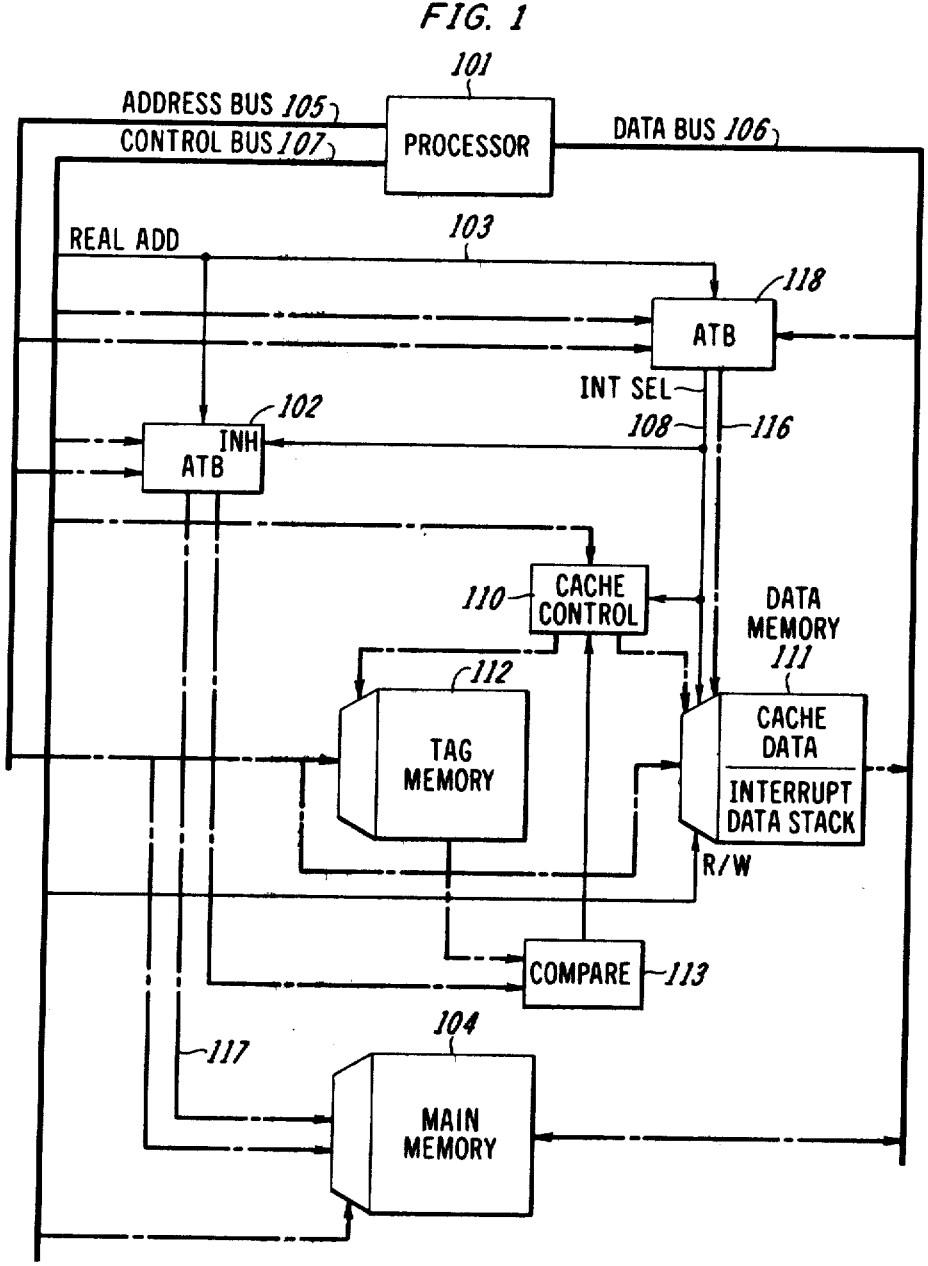
FIG. 1 is a block diagram of an illustrative computer system in accordance with this invention.

One illustrative embodiment of a data processing system according to the invention is shown in FIG. 1. Processor 101 can access data words which are stored in either the main memory 104 or the data memory 111, and can transmit either real addresses or virtual addresses. Data memory 111 has an interrupt stack data section and a cache data section. If a virtual address is transmitted by processor 101, it must be translated into a real address defining a physical memory location before it can be utilized by main memory 104 or data memory 111. Certain virtual addresses are translated by address translation buffer (ATB) 102 into a set of real addresses which can be utilized by main memory 104 and the cache data section of data memory 111. ATB 118 is used to translate other virtual addresses into a second set of real addresses which can be utilized for addressing the interrupt stack data section. Each set can contain one or more real addresses. ATB 102 and ATB 118 may be implemented using the translation lookaside table method for address translation which is well known in the art.

The virtual address is composed of segment, page, and word address bits. The segment address bits designate which segment of the memory is to be accessed, and the page address bits designate which page of the memory within the segment is to be accessed. The word address bits designate the word within the page which is to be accessed. Only the segment and page address bits of the virtual address must be translated by ATB 102 and ATB 118. The word address bits do not have to be translated since the word address bits can be used directly by either main memory 104 or data memory 111.

A cache memory is implemented by tag memory 112, cache control 110, comparator 113, and the cache data section of data memory 111; and an interrupt stack memory is implemented by ATB 118 and the interrupt stack data section of data memory 111. This type of cache memory implementation is well known in the art, and an example of such a memory is detailed in U.S. Pat. No. 4,197,580 of S. J. Chang and W. N. Toy. The cache memory is active during all normal memory read operations. While the virtual-to-real address translation is taking place, the word address bits are used to access the tag memory 112 and the data memory 111. Only a small number of words contained in main memory 104 are also duplicated in data memory 111. Tag memory 112 defines which words of main memory 104 are duplicated in data memory 111. Cache control 110 performs the function of moving data words from main memory 104 into data memory 111 and properly updating tag memory 112. This operation of updating the tag memory 112 and the data memory 111 is defined in the above-noted Chang et al. patent. For each cache data word location in data memory 111, there is a corresponding data location in tag memory 112 which is also addressed by the same word address bits. Each data location in tag memory 112 contains the real address where the corresponding data word in data memory 111 can be found in main memory 104. When processor 101 transmits the virtual address via address bus 105 and read request via bus 107, ATB 102 starts the translation from the virtual address to the real address, tag memory 112 starts to access the words designated by the word address, and data memory 111 starts the access to the data word. The real address bits generated by ATB 102 are compared by comparator 113 against the accessed word of tag memory 112. If a match occurs, it means that the word being accessed by processor 101 is being read out of data memory 111. If a match does not occur, then the cache control 110 transmits a request via control bus 107 to main memory 104, requesting that the word be read from main memory 104.

In order to provide a fully protected environment for a multiprogramming system, it is known in the art for a processor to have different modes of operation. These modes are kernel, executive, supervisor, and user. The mode in which the processor is running is determined by the state of the PSW (Processor Status Word) register. The kernel mode is used by the operating system for page management, scheduling, and interrupt processing. If not in the kernel mode when an interrupt occurs, the processor will enter the kernel mode in order to process the interrupt.

In order to handle an interrupt, processor 101 stores context information in the interrupt stack data section of data memory 111 by transmitting for each data word of context information, the R/W signal as a "1" and the kernel mode signal, virtual address bits for which ATB 118 has the real address, and data bits via buses 107, 105, and 106, respectively. When these conditions are present, ATB 118 generates the real address which is transmitted via bus 116 and selects the interrupt stack data section of data memory 111 by transmitting, via conductor 108, the INT SEL signal. With the interrupt stack data section selected, the data memory 111 responds to the R/W signal being a "1" by storing the data being transmitted via bus 106 in the word location of the interrupt stack data section addressed by the word address bits transmitted via address bus 105 and the real address being transmitted via bus 116. The INT SEL signal also inhibits ATB 102 via its inhibit input. After storing the context information in data memory 111, processor 101 will perform the necessary operations to handle the interrupt. Before processor 101 returns to the interrupted routine, the context information must be restored to the proper registers and flip-flops in processor 101 from data memory 111. This is done by processor 101 performing a read operation for each data word of context information. The read operations are similar to the write operation previously described except that processor 101 transmits the R/W signal as a "0" rather than as a "1" and data memory 111 transmits data via data bus 106 rather than processor 101.

Figure 2:
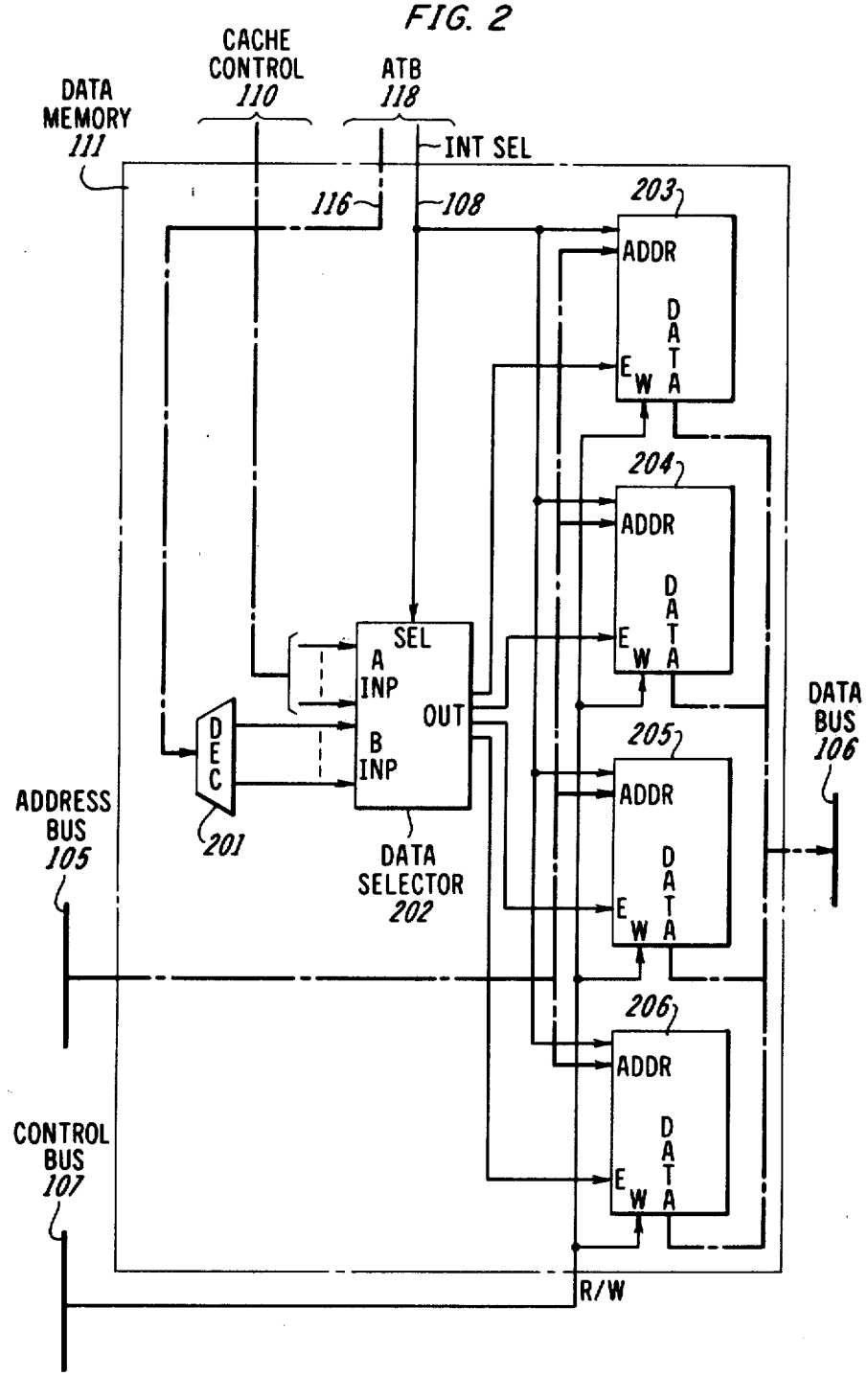
FIG. 2 is a block diagram showing additional detail of the data memory used in the illustrative computer system of FIG. 1.

Data memory 111 is shown in greater detail in FIG. 2. The segment and page bits (bits 9 through 21) are translated by ATB 102 into the real address to be used by the main memory. The word bits (bits 0 through 8) are used directly by the tag memory 112 and the data memory 111 during both cache and interrupt stack operations. Memory modules 203 through 206 each contain 1024 data words and are composed of Random Access Memory (RAM) integrated circuits. The first group of 512 data words in each of the memory modules comprises part of the cache data section of data memory 111, and the second group of 512 data words of each memory module comprises part of the interrupt stack data section of data memory 111. The most significant address bit of each module is the INT SEL signal which is transmitted via conductor 108, and the least significant address bits are the word address bits of the virtual address being transmitted by processor 101 via address bus 105. When a "1" is being transmitted via conductor 108, the interrupt stack data section of the memory modules will be accessed since the most significant address bit transmitted to the memory modules (INT SEL) is a "1"; when a "0" is being transmitted via conductor 108, the cache data section of the memory modules will be accessed. Data selector 202 will select signals transmitted from cache control 110 which are received on the "A" input terminals to its output terminals if a "0" is being transmitted on conductor 108; and data selector 202 will select the "B" input terminals which are receiving signals transmitted from decoder 201 if a "1" is being transmitted via conductor 108. Decoder 201 decodes the two address bits transmitted from ATB 118 via bus 116. The outputs of data selector 202 determine which memory module or modules are selected for either a cache or an interrupt stack operation. During interrupt stack operations, the INT SEL signal is transmitted as a "1." When a "1" is being transmitted via conductor 108, the interrupt stack data section of the memory modules 203 through 206 will be selected and the memory module designated by decoder 201 will be used. The R/W signal determines whether or not the memory modules 203 through 206 will perform a read or a write operation.

In order for processor 101 to perform certain tasks associated with the updating of ATB 102 and ATB 118, it is necessary for processor 101 to be able to directly address main memory 104 with real addresses. ATB 102 and ATB 118 respond to the REAL ADD signal transmitted by processor 101 via control bus 107 by allowing processor 101 to address main memory 104 using real addresses. If the REAL ADD signal is being transmitted as a "0" via conductor 103, this indicates that processor 101 is generating real addresses not virtual addresses on address bus 105. The effect of the REAL ADD signal being a "0" is to inhibit ATB 102 and ATB 118 from performing address translations and to inhibit the generation of the INT SEL signal by ATB 118. When ATB 102 receives a "0" on conductor 103, ATB 102 does not translate the address bits on address bus 105, but transmits these bits unchanged to main memory 104 via bus 117.

Figure 3:
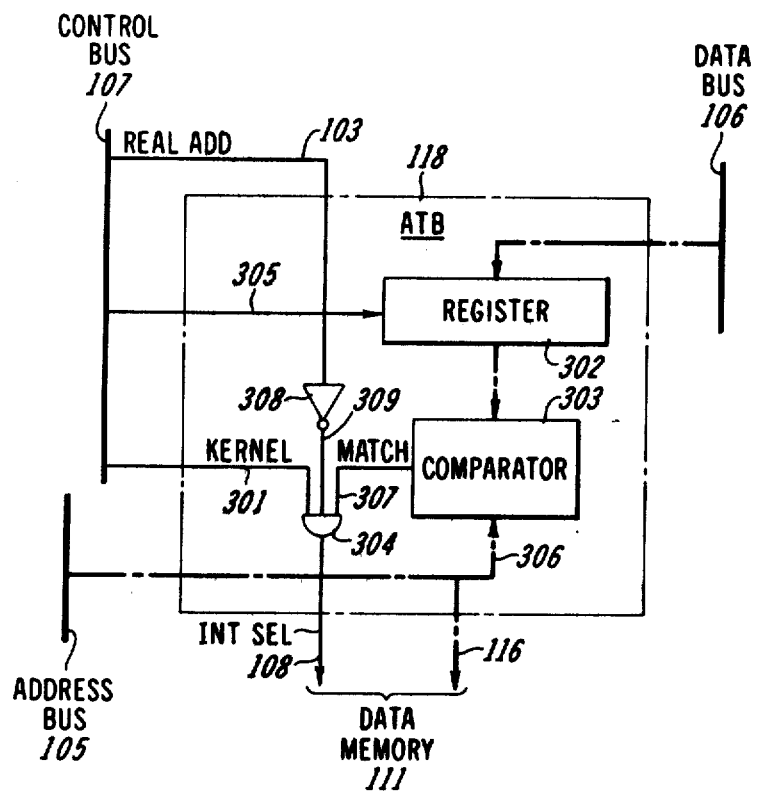
FIG. 3 is a block diagram showing additional detail of the address translation buffer 118 (ATB) used in the illustrative computer system of FIG. 1.

Another implementation of ATB 118 is illustrated in FIG. 3. This implementation of ATB 118 allows for a virtual address space of four consecutive pages. The two least significant bits of the page address (bits 9 and 10 of the virtual address) are transmitted directly via bus 116 to data memory 111. The remaining virtual address bits (bits 11 through 21) are compared by comparator 303 with the contents of register 302. If a match occurs during this comparison, a "1" will be transmitted via conductor 307 to AND gate 304. If the processor is in the kernel mode (a "1" being transmitted via conductor 301) and the processor is not using real addresses (a "0" is being transmitted via conductor 103), and a "1" is being transmitted via conductor 307, AND gate 304 will transmit a "1" via conductor 108. The state of conductor 103 is inverted by inverter 308 whose output is transmitted to gate 304 via conductor 309. Processor 101 loads the information stored in register 302 by transmitting the information on data bus 106 and by transmitting a "1" on conductor 305.

Register 302, illustrated in FIG. 3, may be composed of well-known D type flip-flops. However, the function of register 302 could also be implemented using manual switches to determine the virtual address to which ATB 118 would respond.

It is to be understood that the above-described embodiment is merely illustrative of the the principles of this invention; other arrangements may be devised by those skilled in the art without departing from the spirit and scope of the invention.

What is claimed is:

1. A computer system comprising:
   a processor (101) generating and transmitting virtual address signals, mode control signals and read control signals;
   main memory means (104);
   buffer memory means (110, 111, 112, 113); and
   address translation means (102, 118) responsive to said virtual address signals for generating real address signals for said main memory means and said buffer memory means;
   characterized in that said buffer memory means comprises a cache memory portion having a plurality of cache memory locations and an interrupt stack portion having a plurality of interrupt stack memory locations;
   said address translation means is responsive to certain of said virtual address signals for generating real address signals of a first set for accessing said main memory and said cache memory portion and responsive to others of said virtual address signals for generating real address signals of a second set and a select signal; and
   said buffer memory means is responsive to real address signals of said first set to selectively access said cache memory locations and responsive to real address signals of said second set and said select signal to access said interrupt stack locations.

2. A computer system in accordance with claim 1 further characterized in that said address translation means comprises a first address translation buffer means (102) responsive to said certain virtual address signals for generating said real address signals of said first set and a second address translation buffer (118) responsive to said other virtual address signals to generate real address signals of said second set and said select signal.

3. A computer system in accordance with claim 2 characterized in that said second address translation buffer means comprises a register means (302) and a comparison means (303) responsive to contents of said register means and said others of said virtual address signals to generate said select signal if contents of said register means is identical to any of said others of said virtual address signals.

4. A computer system in accordance with claim 3 wherein said processor is further adapted to generate and to transmit a write control signal and a control word characterized in that said register means is responsive to said write control signal to store said control word to said register means.

5. A computer system in accordance with claim 1 further characterized in that said cache memory portion further comprises a tag memory means (112), cache control means (110), comparison means (113), and data memory means (111);
   said virtual address signals further comprise segment address signals, page address signals and word address signals;

said address translation means is responsive to said segment address signals and said page address signals of said certain of said address signals to generate said significant address signals;

said real address signals of said first set further comprise said significant address signals and said word address signals;

said tag memory and said data memory means being responsive to said read control signals and said word address signals to read a first and a second data word;

said comparison means being responsive to said significant address signals and said first data word to generate and to transmit to said cache control means a first cache signal if said significant address signals equal said first data word;

said cache control means being responsive to said first cache signal to generate and to transmit a second cache signal to said data memory means; and said data memory means being responsive to said second cache signal to transmit said second data word to said processor.

6. A computer system in accordance with claim 2 characterized in that said first address translation buffer is responsive to said select signal to inhibit the generation of said real address signals.

7. A computer system comprising:

a processor generating and transmitting virtual address signals, mode control signals, and read control signals;

main memory means;

buffer memory means;

cache controller means; and address translation means responsive to said virtual address signals for generating real address signals for said main memory means and said buffer memory means;

said buffer memory means comprises a cache memory portion having a plurality of cache memory locations and an interrupt stack portion having a plurality of interrupt stack memory locations;

said address translation means is responsive to certain of said virtual address signals for generating real address signals of a first set for accessing said main memory and said cache memory portion and responsive to others of said virtual address signals for generating real address signals of a second set and a select signal;

said cache controller means responsive to said virtual address signals to generate cache control signals; and said buffer memory means is responsive to real address signals of said first set and said cache control signals to selectively access said cache memory locations and responsive to real address signals of said second set and said select signal to access said interrupt stack locations.

8. A computer system in accordance with claim 7 wherein said address translation means comprises a first address translation buffer means responsive to said certain virtual address signals for generating said real address signals of said first set and a second address translation buffer responsive to said other virtual address signals to generate real address signals of said second set and said select signal.

9. A data processing system in accordance with claim 8 wherein said second address translation buffer means comprises register means and comparison means responsive to contents of said register means and said other virtual address signals to generate said select signal if contents of said register means is identical to any of said other virtual address signals.

10. A data processing system in accordance with claim 9 wherein said processor is further adapted to generate and to transmit a write control signal and a control word; and said register means is responsive to said write control signal to store said control word to said register means.

11. A data processing system in accordance with claim 8 wherein said first address translation buffer is responsive to said select signal to inhibit the generation of said real address signals.

* * * * *